United States Patent
Zidan

(10) Patent No.: US 7,094,387 B2
(45) Date of Patent: Aug. 22, 2006

(54) COMPLEX HYDRIDES FOR HYDROGEN STORAGE

(75) Inventor: Ragaiy Zidan, Aiken, SC (US)

(73) Assignee: Washington Savannah River Company LLC, Aiken, SC (US)

(*) Notice: Subject to any disclaimer, the term of this patent is extended or adjusted under 35 U.S.C. 154(b) by 258 days.

(21) Appl. No.: 10/700,001

(22) Filed: Nov. 3, 2003

(65) Prior Publication Data

US 2004/0105805 A1    Jun. 3, 2004

Related U.S. Application Data

(60) Provisional application No. 60/423,172, filed on Nov. 1, 2002.

(51) Int. Cl.
| | |
|---|---|
| *C01B 6/00* | (2006.01) |
| *C01B 6/02* | (2006.01) |
| *C01B 6/04* | (2006.01) |
| *C01B 6/24* | (2006.01) |
| *C01B 3/04* | (2006.01) |

(52) U.S. Cl. .................. 423/644; 423/645; 423/646; 423/648.1; 423/658.2

(58) Field of Classification Search ............... 423/644, 423/658.2, 645, 646, 648.1
See application file for complete search history.

(56) References Cited

U.S. PATENT DOCUMENTS

| | | | |
|---|---|---|---|
| 3,720,752 A | 3/1973 | Van Houten | |
| 4,360,569 A | 11/1982 | Steyert et al. | |
| 4,790,985 A * | 12/1988 | Nelson | ........................ 423/644 |
| 4,948,423 A | 8/1990 | Fetcenko et al. | |
| 5,411,928 A | 5/1995 | Heung et al. | |
| 5,460,745 A | 10/1995 | Lee | |
| 5,500,309 A | 3/1996 | Lichtenberg et al. | |
| 5,738,736 A | 4/1998 | Tsuji et al. | |
| 6,074,453 A | 6/2000 | Anderson et al. | |
| 6,106,801 A | 8/2000 | Bogdanovic et al. | |
| 6,245,165 B1 | 6/2001 | Arvidsson et al. | |
| 6,251,349 B1 | 6/2001 | Zaluska et al. | |
| 6,258,184 B1 | 7/2001 | Iba et al. | |
| 6,268,077 B1 | 7/2001 | Kelley et al. | |
| 6,274,194 B1 | 8/2001 | Mori et al. | |
| 6,277,519 B1 | 8/2001 | Ishii et al. | |
| 6,305,442 B1 | 10/2001 | Ovshinsky et al. | |
| 6,342,198 B1 | 1/2002 | Zaluska et al. | |
| 6,471,935 B1 * | 10/2002 | Jensen et al. | ................ 423/646 |
| 6,596,055 B1 | 7/2003 | Cooper et al. | |
| 6,680,042 B1 | 1/2004 | Schulz et al. | |
| 6,680,043 B1 * | 1/2004 | Yebka et al. | ............. 423/648.1 |

(Continued)

FOREIGN PATENT DOCUMENTS

WO   PCT/EP01/02363   9/2001

(Continued)

OTHER PUBLICATIONS

Bogdanovic et al, "Metal-doped sodium aluminum hydrides as potential new hydrogen storage materials," J. Alloys & Compounds, 302 (2000) 36-58, no month.

(Continued)

*Primary Examiner*—Wayne A. Langel
(74) *Attorney, Agent, or Firm*—J. Bennett Mullinax, LLC

(57) ABSTRACT

A hydrogen storage material and process of forming the material is provided in which complex hydrides are combined under conditions of elevated temperatures and/or elevated temperature and pressure with a titanium metal such as titanium butoxide. The resulting fused product exhibits hydrogen desorption kinetics having a first hydrogen release point which occurs at normal atmospheres and at a temperature between 50° C. and 90° C.

7 Claims, 5 Drawing Sheets

U.S. PATENT DOCUMENTS

| 6,773,692 | B1* | 8/2004 | Pecharsky et al. | 423/658.2 |
| 6,793,909 | B1* | 9/2004 | Gross et al. | 423/644 |
| 2002/0166286 | A1 | 11/2002 | McClaine et al. | |
| 2003/0053948 | A1 | 3/2003 | Bogdanovic et al. | |
| 2003/0165423 | A1* | 9/2003 | Gross et al. | 423/644 |
| 2004/0009121 | A1* | 1/2004 | Jensen et al. | 423/648.1 |

FOREIGN PATENT DOCUMENTS

WO  PCT/US03/34980  11/2003

OTHER PUBLICATIONS

Jensen et al, "Advanced titanium doping sodium aluminum hydrides: segue to a practical hydrogen storage material?" Intl. J. Hydrogen Energy 24 (1999) 461-465, no month.

Ruggeri, et al, "Influence of carbon on the electrode characteristics of MgNi prepared by mechanical alloying," J. Alloys & Compounds 343 (2002) 170-178, no month.

Iwakura et al, "A new electrode material for nickel-metal hydride batteries: MgNi-graphite composites prepared by ball-milling," J. Alloys & Compounds 293-295 (1999) 653-657, no month.

Bouaricha et al, "Activation characteristics of graphite modified hydrogen absorbing materials," J. Alloys & Compounds 325 (2001) 245-251, no month.

Zalusa et al, "Sodium alanates for reversible hydrogen storage," J. Alloys & Compounds 298 (2000) 125-134, no month.

Ritter et al, "Implementing a hydrogen economy," materialstoday, Sep. 2003, pp. 18-23.

Jensen, Zidan, Mariels, Hee & Hagan, "Advanced titanium doping of sodium aluminum hydride: segue to a practical hydrogen storage material?" Intl. J. Hydrogen Energy 24 (1999) 461-465, no month.

Zidan, Takara, Hee & Jensen, "Hydrogren cycling behavior of zirconium and titanium—zirconium-doped sodium aluminum hydride", J Alloys and Compounds 285 (1999) 119-122, no month.

Bogdanovic & Schwickardi, "Ti-doped alkali metal aluminum hydrides as potential novel reversible hydrogen storage materials" J. Alloys and Compounds 253-254 (1997) 1-9, no month.

Ashby & James, "An Investigation of the Direct Synthesis of Group Ia Hexahydridoaluminates" Inorganic Chemistry, vol. 8, No. 11, Nov. 1969, pp. 2468-2472.

Zakharkin, Gavrilenko, Antipin, & Struchkov, "Preparation of Sodium Hexahydroaluminate $Na_3AlH_6$" Russian Journal of Inorganic Chemistry, vol. 12, No. 5, May 1967 pp. 607-610.

* cited by examiner

COMPLEX HYDRIDES FOR HYDROGEN STORAGE

RELATED APPLICATIONS

This application claims the benefit of U.S. Application Serial No. 60/423,172 filed on Nov. 1, 2002, and which is incorporated herein by reference.

STATEMENT AS TO RIGHTS TO INVENTIONS MADE UNDER FEDERALLY SPONSORED RESEARCH AND DEVELOPMENT

This invention was made with Government support under Contract No. DE-AC09-96-SR18500 awarded by the United States Department of Energy. The Government has certain rights in the invention.

FIELD OF INVENTION

The present invention relates generally to the field of a reversible hydrogen storage material. More particularly, the present invention relates to metal hydrides. In particular, the invention relates to complex metal hydride materials which have been melted or heated near the material's melting point, under a combination of temperature and pressure, so as to provide a unique hydrogen storage material and a method for making the same.

BACKGROUND OF THE INVENTION

Hydrogen has long been proposed as an optimal fuel for transportation needs due to its abundance as well as its environmentally friendly properties. To date, the use of hydrogen as a fuel source has been limited by difficulties in providing adequate hydrogen storage capabilities, particularly for vehicular use. Heretodate, the primary methods of hydrogen storage involve storage as a compressed gas in pressurized tanks or utilizing low temperature storage as liquid hydrogen. Such storage mechanisms are impediments to vehicular use of hydrogen fuel, since high pressure and cryogenic storage technology are impractical for vehicular use. As a result, there have been extensive efforts to develop hydrogen storage systems using materials which offer the combination of high density hydrogen storage capabilities, favorable hydrogen dissociation kinetics, and using materials and processes having sufficiently low costs to be feasible for commercial transportation applications.

For instance, it is known in the art that the kinetics of hydrogen desorption from some alanates can be enhanced by doping an alanate such as sodium aluminum hydride with a transition metal. Sodium aluminum hydride has poor hydrogen storage kinetics and is reversible only under severe conditions of temperature and/or pressure change. Recently, it has been established that titanium doping of $NaAlH_4$ can enhance the kinetics of hydrogen desorption and can provide for more moderate conditions for dehydriding. Work by Bodanovic and Schwickardi, as described in U.S. Pat. No. 6,106,801, and which is incorporated herein by reference, provides for titanium wet doping of $NaAlH_4$ using an ether suspension have a 2 mole percent of titanium tetra-n-butoxide $(Ti(OBu)_4$ However, the temperatures and kinetics of hydrogen adsorption and desorption of the doped material are such that the material still remains impractical for transportation applications.

U.S. Pat. No. 6,074,453 (assigned to Iowa State University Research Foundation, Inc.), incorporated herein by reference, discloses a method for making a hydrogen storage powder which is gas atomized under high temperatures and pressures to form generally spherical powder particles. The powder exhibits a small particle size which is stated to be resistant to microcracking during hydrogen adsorption/desorption cycling. However, the '453 reference utilizes hydrogen storage materials such as $LaNi_5$ and other similar $AB_5$ type materials which are too expensive for widespread use in transportation needs. Additionally, the resulting hydrogen storage powder set forth in the '453 patent requires substantial temperature and pressure variations in order to bring about useful adsorption and desorption cycles.

There remains a need for hydrogen storage materials that have a useful hydrogen storage capacity combined with low stringency release kinetics. Accordingly, there remains room for variation and improvement within the art of hydrogen storage materials.

SUMMARY OF THE INVENTION

It is one aspect of one of the present embodiments to provide a hydrogen storage material which can achieve a release of stored hydrogen at a temperature of about 80–90° C. and demonstrate practical kinetics.

It is yet another aspect of at least one of the present embodiments to provide a mixture of a sodium aluminum hydride $(NaAlH_4)$ with a small percentage such as about 0.5 to about 5.0 percent by weight of titanium or other transition metals. The sodium aluminum hydride and titanium form, under conditions of heat and pressure, a substantially homogeneous material having the ability to absorb about 5.2 percent by weight of hydrogen, a portion of the stored hydrogen being releasable at a temperature of about 50° C. to about 90° C.

It is yet another aspect of at least one of the present embodiments to provide a hydrogen storage material which results from the temperature and pressure fusion of transition metals with a complex hydride, thereby forming a homogeneous melted material having lower temperature hydrogen desorption kinetics.

It is yet another aspect of at least one of the present embodiments to provide a hydrogen storage material which results from the combining of a transition metal near a melting point of the complex hydride which, when cooled, has hydrogen storage properties including low temperature hydrogen desorption kinetics.

It is yet another aspect of at least one of the present embodiments of the invention to provide a hydrogen storage material comprising a high pressure melted fusion of an alanate selected from the group consisting of alkali-metal hydrides, complex metal hydrides, and combinations thereof, and a metal dopant selected from the group consisting of groups III through V transition metals, lanthanum metal complexes, iron, nickel, rare earth metals and combinations thereof. The metal dopants may include alcoholates, alkoxides, halides, hydrides, and organometallic and intermetallic compounds of the referenced metal dopants.

It is yet another aspect of at least one of the present embodiments to provide a hydrogen storage material formed by a pressurized melt, the resulting melt product having useful thermal desorption properties which occur at or about 50° C., indicative of kinetic enhancement of hydrogen sorption properties. Mixtures of different alanates, alanates and borohydrides, and alanates and different elements can be fused near or at the melting point of the mixtures or the melting point of one of the elements in the mixture. The mixture enables substitution of elements among the precursor reagents or results in the formation of a new composition(s).

These and other features, aspects, and advantages of the present invention will become better understood with reference to the following description and appended claims.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings.

DESCRIPTION OF THE PREFERRED EMBODIMENT

Figure 1:
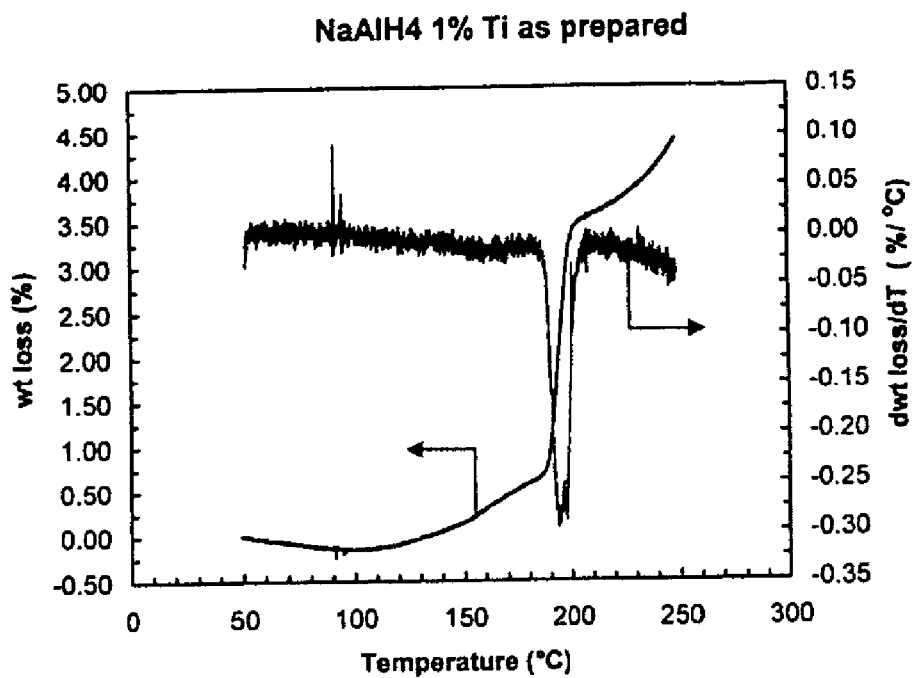
FIG. 1 sets forth hydrogen desorption kinetics of a prior art hydrogen storage material, $NaAlH_4$ with 1 percent titanium prepared by a conventional ball milling process using sodium aluminum hydride ($NaAlH_4$) and a titanium metal such as titanium butoxide.

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention covers such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

In describing the various figures herein, the same reference numbers may be used throughout to describe the same material or process pathway. To avoid redundancy, detailed descriptions of much of the materials or processes once described in relation to a figure or an embodiment may not be repeated in the descriptions of subsequent figures or embodiments, although such material or process may be identified with the same reference numbers.

The present invention provides for a product and a process for producing a product in the form of novel materials formed under melting conditions formed by a combination of heat and pressure. A metal complex hydride in combination with a transition metal, a mixture of other complex hydrides and/or other elements are subject to the melt conditions. The resulting cooled material, hereinafter referred to as a "fused" or "hybrid" product, results in a hydrogen storage material having improved properties with respect to hydrogen storage capacity and hydrogen release kinetics compared to prior art hydrogen storage materials prepared from physical ball milling techniques and/or chemical treatment techniques. Additionally, the fused products exhibit excellent performance of repeated cycles of hydrogen adsorption and desorption.

Alternatively, fused or hybrid products can be formed by bringing the reactants under temperature and pressure a few degrees below a melting point of at least one of the mixture components. Under these conditions, it is believed that various elements within the mixture components may substitute with one another so as to bring about a resulting novel fused or hybrid product having beneficial hydrogen storage capacity and release kinetics.

While not wishing to be limited by theory, it is believed that the resulting fused product achieves an enhanced distribution and uniformity of materials. The resulting fused product exhibits excellent physical stability and has desirable hydrogen adsorption and release kinetics.

As a result of the improved thermodynamics of the fused product, lower temperature changes can be used to bring about a release of stored hydrogen. The observed improvement in kinetics represents a fundamental advance in capabilities of alanate-based hydrogen storage materials. Additionally, the ability to form fused products allows for materials having enhanced amounts of dopants which are believed to offer even further improvements in the hydrogen storage kinetics. It is believed that the fusion of dopant metals such as transition metals with complex hydrides results in a fused product having improved hydrogen storage properties. The improvements are believed attributable to the high mobility of atoms which occurs at or near the melting state of the complex hydride and which results in a more homogeneous product.

EXAMPLE 1

One example of a fused hydrogen storage product is provided by the reaction product of one gram of sodium aluminum hydride mixed with 1 to 2 milliliters of 100 mM titanium butoxide in tetrahydrofuran (THF), the volume of titanium butoxide adjusted to achieve a 1 percent by weight target amount of titanium. The two components were mixed and stirred under an inert atmosphere in a glovebox using an agate mortar and pestle until the sample was dried.

The dried sample is placed in a pressure bomb and sealed prior to removal from the glovebox. Outside the glovebox, the bomb is connected to a hydrogen supply line and a separate vacuum line in a "T" configuration. Hydrogen is cycled through the lines to purge air prior to pressurization of the pressure bomb. Following purging, the pressure bomb is opened for pressurization with hydrogen gas to a pressure of about 3700 psi (260 atmosphere). The pressure bomb is then sealed at the elevated pressure and disconnected from the hydrogen supply line.

The pressure vessel is placed inside a heating mantle and brought to a temperature of about 190° C. to about 220° C. for an interval of at least 3 hours. The addition of heat achieves an internal bomb pressure of up to about 5000 psi (353 atmosphere). Following heating, the pressure vessel is cooled to room temperature and then depressurized. Depressurization occurs in an inert atmosphere glove box where the resulting melted material is removed. 20 mg samples are removed for analysis using thermogravimetric techniques, the results of which are set forth in FIG. 2.

Figure 2:
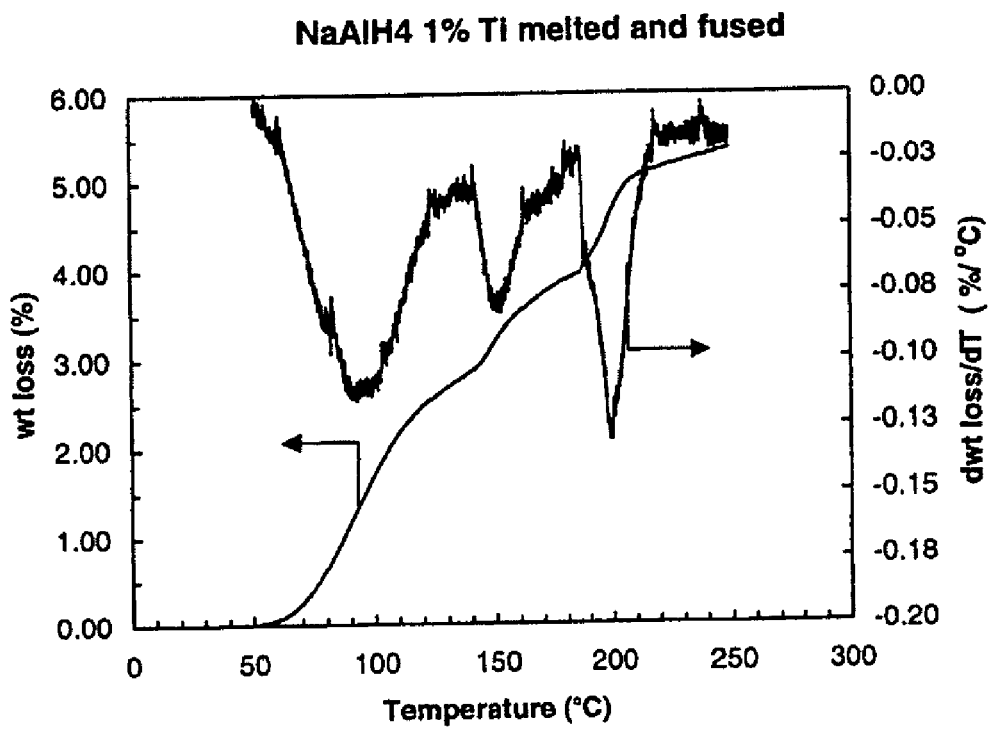
FIG. 2 is a hydrogen desorption graph of a fused mixture of $NaAlH_4$ with a 1 percent titanium butoxide according to the present invention.

As seen in FIG. 2, the fused hydrogen storage material exhibit three distinctive hydrogen release points. The first point occurs at a point beginning at about 50° C. and achieving a more preferable release at between about 80–90° C. As additionally seen in FIG. 2, a second hydrogen release occurs at a temperature between about 140° C. to about 150° C. with a third release at a temperature of about 190° C. to about 200° C. As seen in reference to FIG. 2, the weight loss percent of hydrogen at the lowest temperature release peak is approximately 3.2 percent weight loss of hydrogen

EXAMPLE 2

One gram samples of NaAlH$_4$ doped with 4% TiCl$_3$ were subjected to high intensity ball milling for 2 hours. Following ball milling, the metal hydride was fused by exposure to a temperature of 210° C. and a pressure of 3800 psi using hydrogen gas for about 4 hours. At the end of 4 hours, the temperature and pressures were allowed to gradually equilibrate to standard conditions.

Figure 3A:
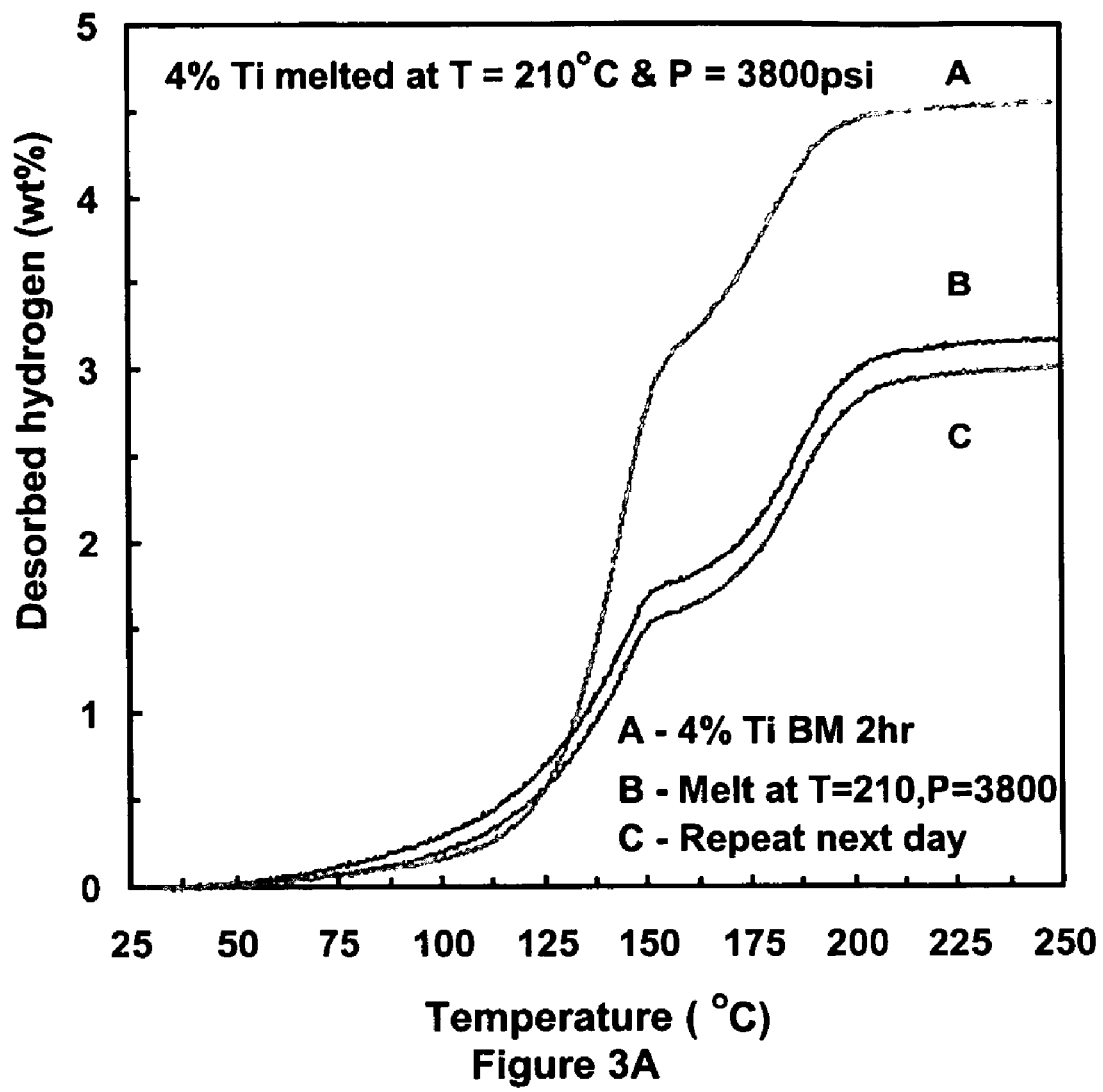
FIGS. 3A and 3B set forth data for thermogravimetric analysis of samples of $NaAlH_4$ doped with 4% $TiCl_3$ prepared by the fusing process of the present invention (3B) and compared to a control sample (3A) prepared only using a ball milling process.

Thermogravimetric analysis (TGA) was performed on control samples (ball milled only) and fused samples which were additionally subjected to the combination of hydrogen pressure and elevated temperature. As seen in reference to FIG. 3A, fused (melt) demonstrate improved low temperature kinetics of the fused samples as opposed to samples obtained by ball milling. The second curve in FIG. 3A is a second temperature program desorption run repeated 24 hours later for the fused product. The kinetics and capacity of the 24 hour delayed run reflects hydrogen desorption from hydrogen which was absorbed overnight.

Figure 3B:
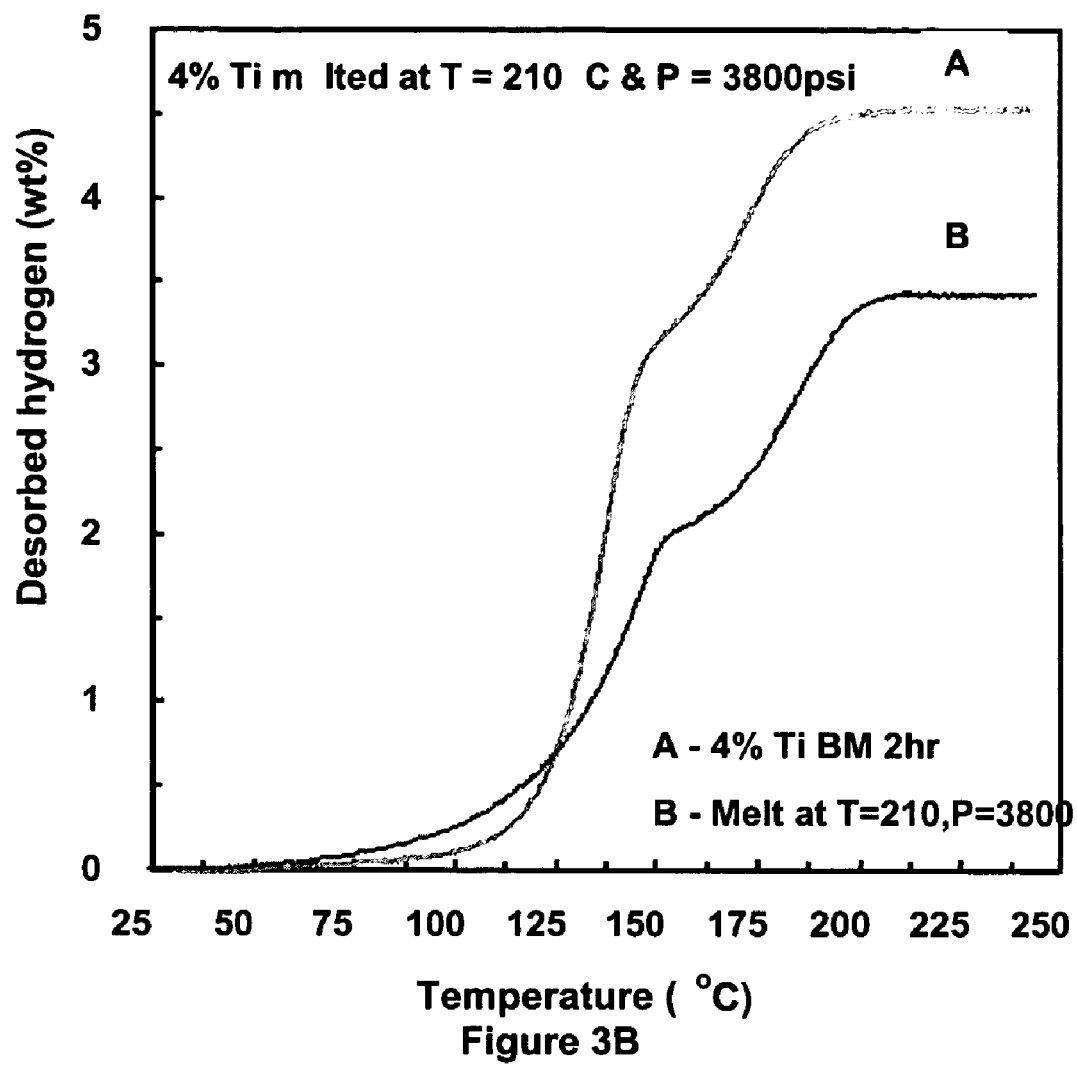
Figure 3C:
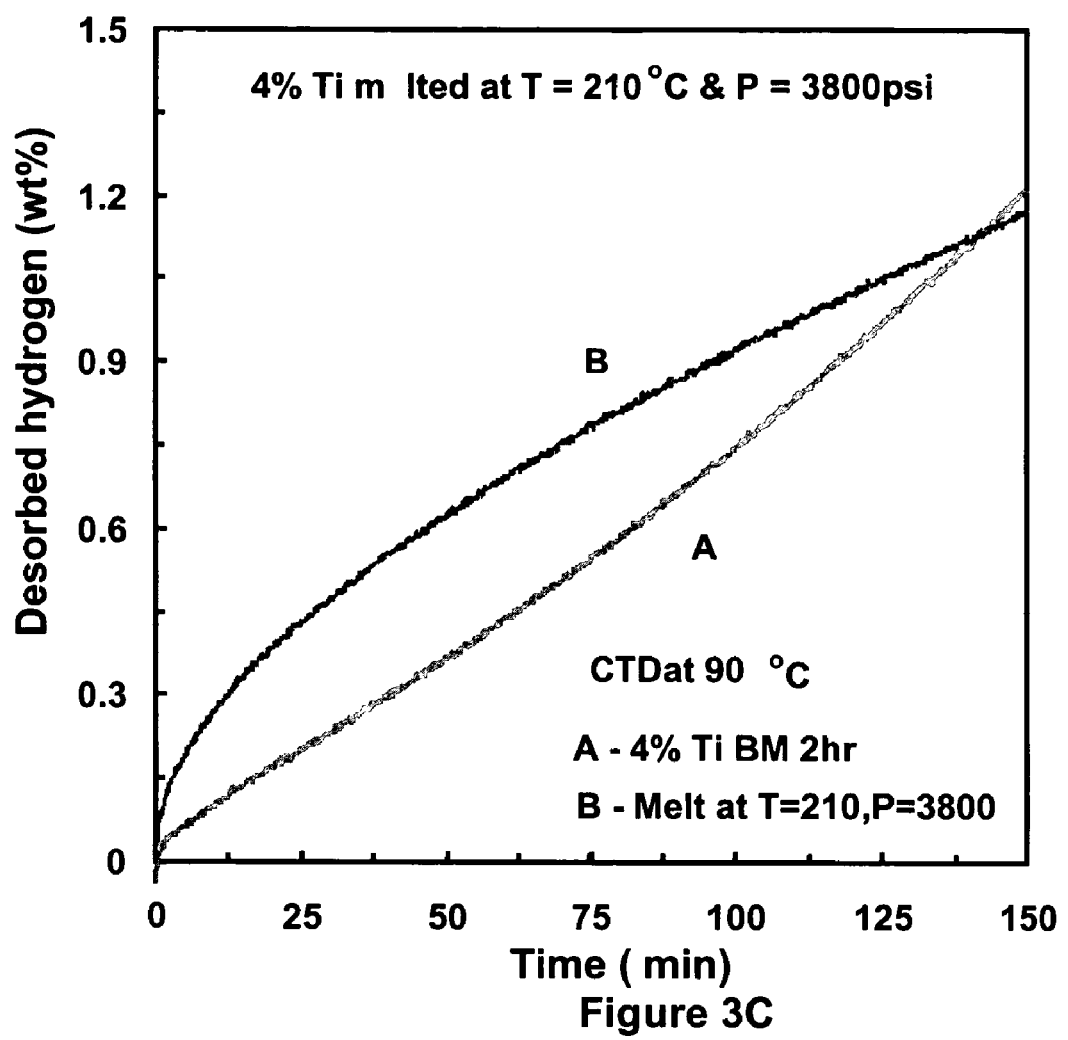
FIG. 3C sets forth data from a constant temperature desorption analysis using the materials described in reference to FIGS. 3A and 3B.

It should be noted that the evaluated of the fused fused product as represented in FIGS. 3A and 3B were made under conditions designed to show differences of low temperature kinetics. The total hydrogen capacity of the fused material can be improved by increasing volumes and by adjusting various ratios of metal hydrides, dopants, and catalyst materials so as to enhance hydrogen adsorption/desorption capacity.

Figure 4A:
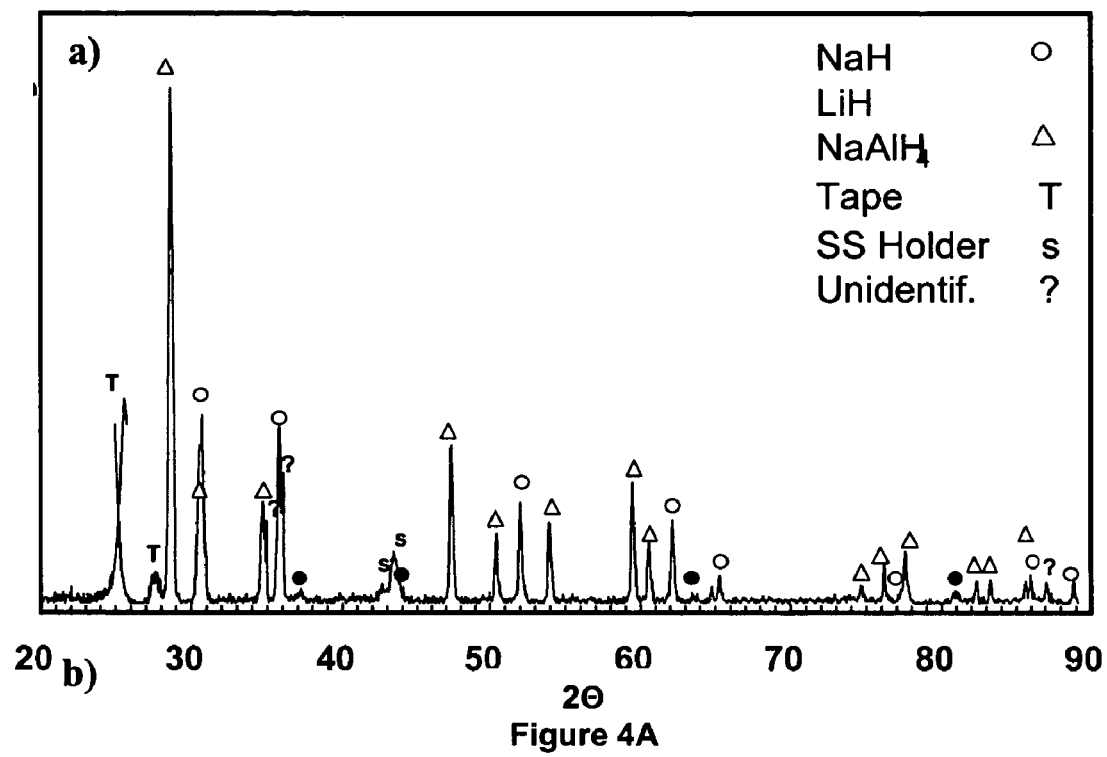
FIG. 4A is an x-ray detraction pattern of a sample of equimolar mixtures of NaHLiH, and $NaAlH_4$ dry mixed with a mortar and pestle.
Figure 4B:
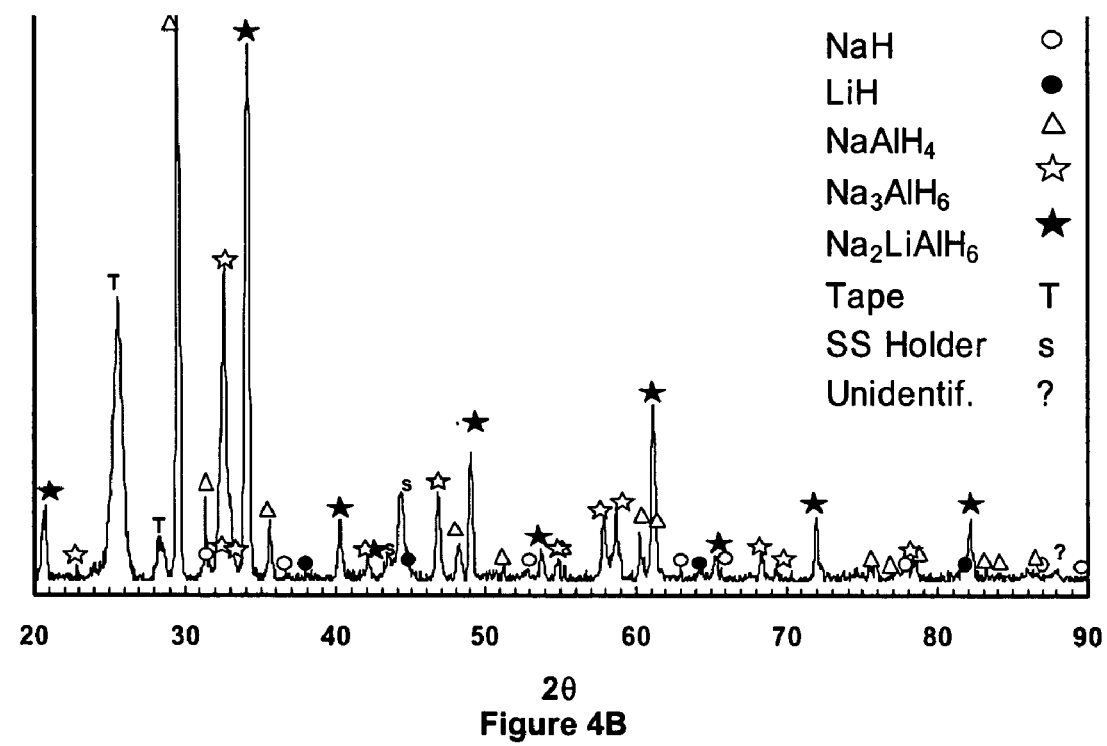
FIG. 4B is an x-ray defraction pattern of the material seen in FIG. 4a following fusion using heat and pressure.

FIG. 4B is a replicate of the materials and processes described above and conducted on a different day. As seen in FIG. 4A, similar kinetics are present for the fused product showing increased desorption kinetics from about 75° to 100° C., and more preferably about 90° C.

EXAMPLE 3

One gram mixtures of a 1:1:1 mole mixture of NaH LiH and NaAlH$_4$ were prepared by a melt preparation process at a temperature of about 210° C. and with a hydrogen pressure of 3800 psi for 4 hours. Prior to the melting process, samples were dry mixed using a mortar and pestle. A sample of the mixture processed only with the mortar and pestle was used as a control sample.

Following the melt preparation process, x-ray detraction patterns were obtained of control samples and the fused/melted samples. Set forth in FIG. 4A is the x-ray defraction pattern of control sample as mixed with only a mortar and pestle. As seen in FIG. 4A, the beginning constituents are identified along with the stainless steel holder "S" and a transparent tape covering "T" placed over the holder.

FIG. 4B sets forth the x-ray defraction patterns of the fused product. As indicated in FIG. 4B, appreciable concentrations of Na$_2$LiAlH$_6$ and Na$_3$AlH$_6$ were formed. The data also indicates that portions of the NaH LiH, and NaAlH$_4$ were left unreacted. It is believed the reaction products identified are from two competing overall reactions including:

(1)

(2)

Observations of repeated hydrogen adsorption and release indicates the melted product exhibits excellent properties in terms of cycling efficiency. These observations suggest the melted reaction product is resistant to loss of structural integrity during repeated cycles of hydrogen pressurization and release.

The ability to create novel fused hydrogen adsorption materials enables one to increase the amounts of titanium and other materials used to form the melted reaction product. The enhanced loading capabilities far exceed prior art loading levels achieved using conventional ball milling or chemical treatment processes. As a result, it is believed that the present process enables categories of wholly new materials which have enhanced storage capabilities and offer improved thermodynamic properties.

It is believed that the present process is useful for a variety of hydrogen storage materials including at least all complex hydrides having the formula of M$_y$(AlH$_{4+z}$)$_x$ where M is an alkaline, alkaline earth metal or transition metal such as sodium, calcium, magnesium, zirconium, or iron; X has a value of between 1 and 4; Y has a value of between 1 and 6; and Z has a value of 0 or 2. Other complex hydrides useful with the present invention are seen in reference to the general formula of M$_y$(BH$_{4+z}$)$_x$ where M is the transition metals identified above, B is boron, and X, Y, and Z have the identified values.

To the extent complex hydrides are used with various catalysts or dopants to bring about improved hydrogen storage properties, it is believed that any of the complex hydrides and typically used catalysts can be melted to form a fused reaction product as described above in which the reaction product will offer improved hydrogen storage capabilities and release kinetics. It is believed that pressurized melting or achieving near melting conditions allow for a more effective distribution of materials than is otherwise possible. As a result, conventional proportions of complex hydrides and catalysts may be used to bring about improved properties upon melting the materials. Additionally, it is believed that enhanced levels of catalysts or dopants, as identified in the references as set forth above, may be used including combining different types of dopants such as titanium, zirconium, vanadium, iron, cobalt, nickel, lanthanum, and mixtures thereof. Heretofore, certain of the catalyst metals incorporated into a metal hydride needed to be present in specialized solvents. The present process provides a way of combining the catalyst-like dopants with the complex hydrides which minimizes the need for solvents and allows for enhanced loading levels of the dopants.

In addition to the complex hydrides set forth above, it is also believed that various borohydride complexes such as NaBH$_4$ may also be used in combination with various catalysts and dopants in which the melted product provides for a hydrogen storage material having improved kinetics and hydrogen storage/release properties. In addition, it is noted that the melted materials studied herein were formed by the gradual cooling of the melt. It is envisioned that the cooling process can be changed to include a rapid quenching which may result in a highly non-crystalline structure which may have different hydrogen storage and release properties.

The formation of the fused hydrogen storage material set forth herein is believed particularly useful for forming rapid combinations of various salts so as to form fused complex hydrides. In addition, it is believed beneficial to combine a complex hydride salt or complex hydride forming salts with an organometallics so as to provide a hydrogen absorbing organosalt. Nonlimiting examples of organometallic compounds include titanium IV tert-butoxide, and bicyclo compounds.

Additionally, the use of melting point conditions allows one the ability to shape the resulting hydrogen storage fused product into various forms. By way of example, an aluminum bed which heretofore may have been filled with particulates of various hydrogen storage materials can now be filled with a shaped, melted profile conforming to the aluminum bed. This allows for a more efficient packing of the bed and hence increased loading abilities for hydrogen storage with respect to the bed size.

Further, the hydrogen storage fused product described herein is believed to have enhanced catalyst distribution in comparison with materials prepared by traditional ball milling or chemical precipitation. As a result, the enhanced catalyst or dopant loading levels allow for unique reaction products to be formed having improved characteristics with respect to overall hydrogen storage capabilities as well as hydrogen release and adsorption kinetics.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention, which is set forth in the following claims. In addition, it should be understood that aspects of the various embodiments may be interchanged, both in whole or in part. Therefore, the spirit and scope of the appended claims should not be limited to the description of the preferred versions contained therein.

The invention claimed is:

1. A process for forming a hydrogen storage material comprising:
   providing a sodium aluminum hydride;
   mixing about 0.5%/wt to about 5.0%/wt of titanium to said sodium aluminum hydride; and,
   supplying a combination of heat and pressure in the presence of hydrogen gas sufficient to melt said sodium aluminum hydride and titanium mixture, thereby providing a fused hydrogen storage material having a hydrogen release point at normal atmospheres of between about 50° C. to about 90° C.

2. A process of forming a hydrogen storage material comprising:
   supplying at least one complex hydride;
   mixing with said complex hydride a dopant selected from the group consisting of titanium, zirconium, vanadium, iron, cobalt, nickel, lanthanum, and mixtures thereof;
   subjecting said mixture of complex hydride and said dopant under pressure in the presence of hydrogen gas;
   raising the temperature of said mixture of said complex hydride and said dopant and said hydrogen gas to a melting point of said complex hydride; and,
   maintaining said heat and pressure for a time sufficient to form a fused product, wherein said fused product has a reversible ability to store and release hydrogen.

3. The process according to claim 2 wherein said at least one complex hydride is sodium aluminum hydride.

4. The process according to claim 2 wherein said at least one complexhydride comprises lithium hydride.

5. The process according to claim 2 wherein said at least one complexhydride comprises sodium hydride.

6. The process according to claim 2 wherein said at least one complex hydride comprises a mixture of sodium aluminum hydride, lithium hydride, and sodium hydride.

7. The process according to claim 6 wherein said sodium aluminum hydride, said lithium hydride, and said sodium hydride are present in about equi-molar amounts.

* * * * *